United States Patent Office 3,626,768
Patented Dec. 14, 1971

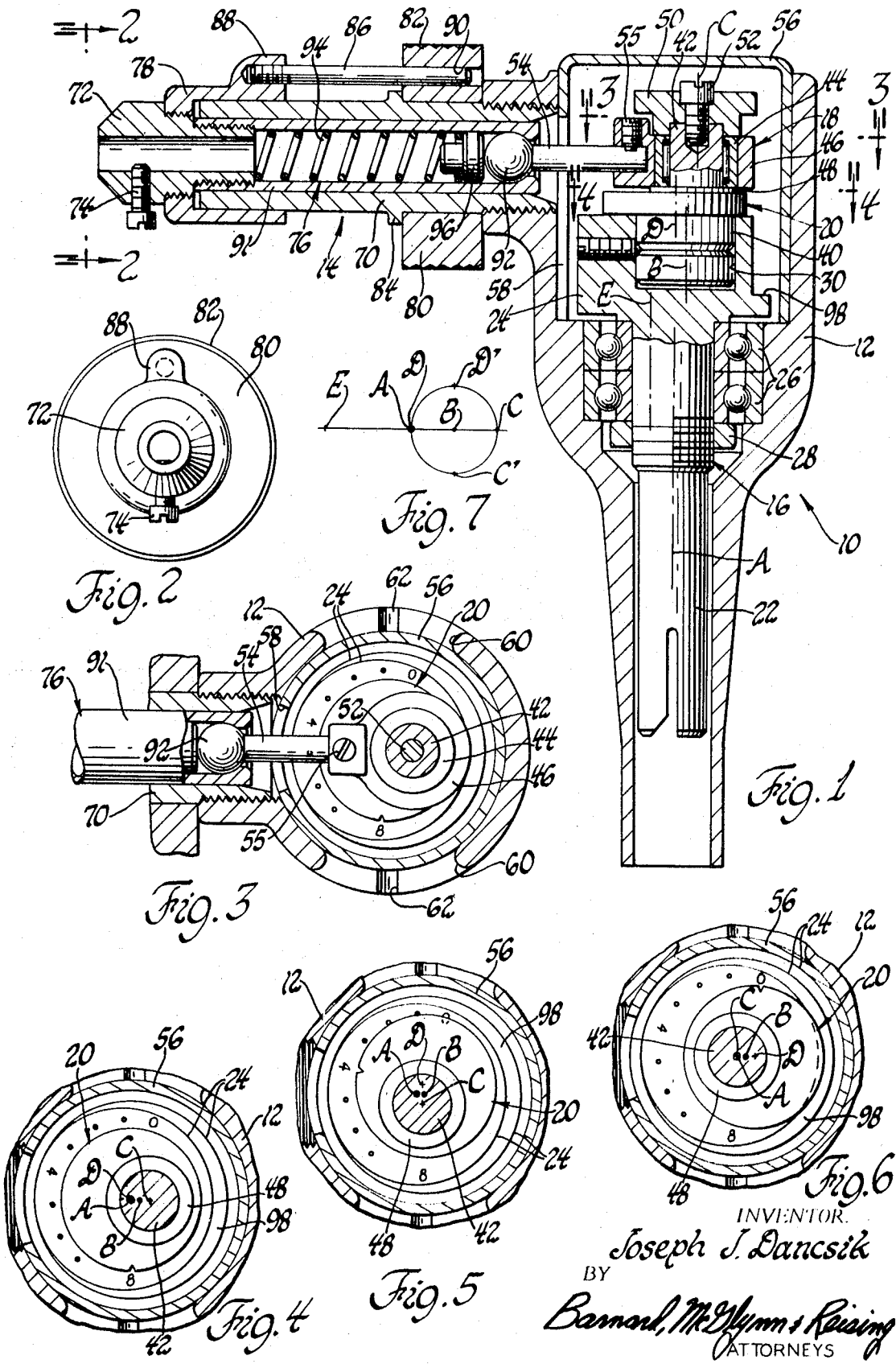

3,626,768
TOOL DRIVE ASSEMBLY
Joseph J. Dancsik, Oak Park, Mich.
(Rosenheingasse 9, Graz, Austria)
Filed Sept. 2, 1969, Ser. No. 854,372
Int. Cl. F16h 21/22
U.S. Cl. 74—44                                          19 Claims

ABSTRACT OF THE DISCLOSURE

A tool drive assembly for converting rotary motion to reciprocating motion. A driven member is rotatably supported in a housing and includes a shank portion and an enlarged head portion with a center of mass offset from the axis of rotation. An intermediate member has a cylindrical portion integral therewith and disposed in a hollow in the head portion. A peg extends upwardly from the intermediate member and forms a part of a connection means which is connected to a reciprocating tool holder member. The intermediate member and the connection means have counterbalancing masses which, in combination with one another, counterbalance the offset mass of the head portion during all adjusted rotary positions of the intermediate member relative to the driven member, which in turn adjusts the length of the stroke of the tool holder member. A tool holder assembly includes a tubular member extending from the housing with a dust cover attached to the tool holder member and slidably and reciprocally disposed about the exterior of the tubular member. A drive means interconnects the tool holder member and the connection means for transmitting the reciprocating motion. A knurled member is disposed about the tubular member adjacent the housing and is connected to the dust cover by a shaft slidably disposed in the knurled member for rotatably adjusting the position of the tool holder member.

This invention relates to a tool drive assembly of the type for converting rotary motion to reciprocating motion.

More specifically, the assembly is of the type utilized by the makers of dies or molds of the type utilized in the injection molding of plastic parts. The assembly is used to define precise surfaces in such molds and dies. An appropriate abrasive or cutting tool is attached to a tool holding member of the assembly and the assembly is manually held by the operator while working on the mold or die. Such assemblies, besides including components for converting rotary motion to reciprocating motion, also include a means for rotating the tool while it is reciprocating. An example of such a prior art assembly is shown in U.S. Pat. No. 2,690,081.

There are basically two problems associated with the prior art assemblies. The first is that in the components utilized in converting rotary motion to reciprocating motion, counterbalancing must be effected and this has not been satisfactorily accomplished in that the components wear relative to one another and adversely affect the balancing. The other problem is that excessive wear occurs in the components utilized for rotating the tool during reciprocating motion so that after such wear the tool cannot be precisely held in a selected rotary position.

Accordingly, it is an object and feature of this invention to provide a tool drive assembly having a novel combination of elements for providing the necessary counterbalancing in converting rotary motion to reciprocating motion and which alleviates the wear problems associated with prior art assemblies.

In correlation with the foregoing objects and features, it is another object and feature of this invention to provide a tool drive assembly having a novel tool holder means for adjusting the rotary position of the tool and which alleviates wear problems associated with the prior art assemblies.

Other objects and attendant advantages of the present invention will be readily appreciated as the same becomes better understood by reference to the following detailed description when considered in connection with the accompanying drawings wherein:

FIG. 1 is a full scale cross-sectional view of a preferred embodiment of the instant invention;

FIG. 2 is a view taken substantially along line 2—2 of FIG. 1;

FIG. 3 is a fragmentary cross-sectional view taken substantially along line 3—3 of FIG. 1;

FIG. 4 is a fragmentary cross-sectional view taken substantially along line 4—4 of FIG. 1;

FIG. 5 is a fragmentary cross-sectional view similar to FIG. 4 but showing the assembly in an adjusted position for providing a different length of stroke;

FIG. 6 is a fragmentary cross-sectional view similar to FIGS. 4 and 5 but showing the assembly in the position to provide a zero length of stroke; and FIG. 7 is a schematic view showing various pertinent axes of the various components of the assembly.

Referring now to the drawings wherein like numerals indicate like or corresponding parts throughout the several views, a tool drive assembly constructed in accordance with the instant invention is generally shown at 10.

The assembly 10 includes a housing 12 which supports a reciprocating tool holder means which is generally indicated at 14. The assembly 10 also includes driven means, generally indicated at 16, rotatable about a first axis A and having an additional portion of mass on one side of the first axis A so as to have a center of mass on the axis E which is offset from the first axis A. The assembly 10 also includes connection means, generally indicated at 18, operatively connected to the tool holder means 14 for reciprocating the latter. The assembly 10 includes the intermediate means, generally indicated at 20, operatively interconnecting the driven means 16 and the connection means 18 to adjust the length of stroke of the reciprocating movement and for maintaining the driven means 16 and the connection means 18 counterbalanced relative to the axis of rotation A.

The driven means 16 includes a shank portion 22 and an enlarged head portion 24. Bearing means comprising the bearings 26 rotatably support the shank portion 22 in the housing 12 for rotation about the first axis A. The driven means 16 includes a shoulder disposed at the top of the upper bearing 26 and a nut 28 threadedly engages the shank portion 22 to coact with the shoulder to retain the driven means 16 in position within the housing. The lower end of the shank portion 22 is adapted to be connected to a rotary cable or the like for imparting rotary motion thereto.

A circular hollow 30 is disposed in the head portion 24 with the center thereof on an axis B, which is a second axis for the purpose of description. The driven means 16 further includes a cylindrical drum-like solid member 40 rotatably disposed in the cavity 30. The driven means 16 also includes an adjustment means operable between the head portion 24 and the cylindrical member 40 for preventing rotation of the cylindrical member 40 and operable to allow rotation of the cylindrical member for adjusting the length of the stroke, such adjustment means comprising a groove in the cylindrical member 40 and a threaded adjustment screw. The center of mass of the driven means 16 which includes the shank portion 22, the enlarged head portion 24, the threaded screw and the cylindrical member 40, is disposed on the axis E.

The intermediate means 20 comprises a circular wafer integrally connected to the cylindrical member 40. The wafer 20 has a geometrical center and a center of mass on the axis D.

The connection means 18 includes a circular peg 42 integral with and extending upwardly from the wafer 20. The center of the peg is on the axis C, which is a third axis for the purpose of description. A second bearing means comprising the roller bearing 44 is disposed about the peg 42. A collar 46 is disposed about the bearing 44. A circular shoulder 48 is disposed about the peg 42 to maintain the bearing 44 and the collar 46 in spaced relationship to the upper surface of the wafer 20. The connection means 18 also includes a cap means, comprising the cap 50 and the screw 52, removably connected to the peg 42 for retaining the bearing 44 and the collar 46 on the peg 42. A rod 54 is connected to the collar 46 by the screw 55 and extends away in a direction which is transverse to the third axis C.

The upper end of the housing 12 is open and a removable cap 56 is disposed therein and has an opening 58 in one side thereof through which the rod 54 extends. As best shown in FIGS. 3 through 6, the housing has downwardly extending openings 60 in either side thereof with notches 62 in the bottoms thereof. When the cover is removed, an appropriate tool may be inserted through the slots or notches 62 to engage the screw threadedly engaging the head portion 24 for rotating the cylindrical member 40 to adjust the length of the stroke.

The tool holder means 14 includes a tubular support member 70 which is threadedly connected to and extends from the housing 12 to a distal end. Also included is a tool attaching member 72 disposed at the distal end of the tubular support member 70 and adapted by the screw 74 for receiving and retaining a tool therein. The tool holder means also includes a drive means generally indicated at 76 and slidably disposed within the tubular support member 70 and operatively interconnecting the tool attaching member 72 and the rod 54.

A dust cover means 78 is threadedly connected to the tool attaching member 72 about the circumference thereof for movement with the tool attaching member 72. The dust cover means 78 extends from the tool attaching member 72 and is disposed about the exterior of the tubular support member 70 for reciprocating and sliding movement relative thereto.

A circular component 80 having a knurled outer surface 82 is disposed about the tubular support member 70 adjacent the housing 12 so as to be rotatably disposed on the tubular support member 70 between the housing 12 and a flange 84 extending from the tubular support member 70. A lost motion means comprising the shaft 86 operatively interconnects the circular component 80 and the cover means 78 for rotating the cover means and the tool attaching member 72 about the axis of the tubular support member 70 during reciprocating movement. More specifically, the cover means 78 includes an upset portion 88 to which one end of the shaft 86 is threadedly connected and the other end of the shaft 86 is slidably disposed in a bore 90 in the circular component 80.

The drive means 76 includes a sleeve 91 threadedly connected at a first end thereof to the tool holder member 72 and slidably disposed within the tubular support member 70. A ball 92 is rotatably retained in the second end of the sleeve 91 but is allowed to move longitudinally relative to the sleeve 91. The rod 54 is integral with or rigidly connected to the ball 92. A spring means comprising the spring 94 and the reaction member 96 reacts between the ball 92 and the tool holder member 72.

By way of review, the axis of rotation of the driven means 16 is the first axis A, the axis of rotation of the circular member 40 relative to the driven means 16 is the second axis B, and the axis of rotation of the connection means 18 relative to the intermediate means or wafer 20 is the third axis C. The central axis of the wafer 20 is a fourth axis D. It will be noted that in rotating the circular member 40 in the hollow 30 the third and fourth axes C and D rotate about the second axis B. The axis E is a fifth axis upon which the center of mass of the driven means 16 is disposed. The mass of the connection means 18 equals the additional mass of the driven means 16 which is disposed on one side of the first axis A. In other words, the amount of mass or the additional mass which causes the center of mass of the driven means 16 to be on the fifth axis E rather than on the first axis A is equal to the mass of the connection means 18. Additionally, the counterbalancing mass of the intermediate means or wafer 20 substantially equals the mass of the connection means 18. In other words, that portion of the mass of the wafer 20 which causes its center of mass to be offset from the second axis B equals the mass of the connection means 18.

The intermediate means or wafer 20 is rotatable relative to the driven means by rotating the cylindrical member 40 in the hollow 30 between a zero length stroke position illustrated in FIG. 6 and a maximum length stroke position as illustrated in FIGS. 1, 3 and 4. When in the zero length stroke position, the wafer 20 counterbalances the driven means 16. When at the maximum length stroke position the connection means 18 counterbalances the driven means 16. It will be noted that the head portion 24 of the driven means 16 has a crescent-shaped recess 98 which makes the left side of the head 24, as illustrated in FIG. 1, heavier than the right side so as to shift the center of gravity of the entire driven means 16 to the left so as to be disposed on the fifth axis E.

The wafer 20 is rotatable relative to the driven means 16 about the second axis B for adjusting the length of the stroke, the second axis B being parallel and offset from the first axis A. The connection means 18 is rotatable relative to the wafer 20 about the third axis C which is offset from the second axis B. All of the axes A, B, C, D and E are parallel to one another.

In the maximum stroke position illustrated in FIGS. 1 and 4, the third axis C is displaced or offset a maximum extent from the first axis A, the axis of rotation. In the maximum stroke position, the third axis C of the connection means 18 rotates about the first axis A, the axis of rotation. Furthermore, in the maximum stroke position the mass of the connection means 18 is counterbalanced by the offset mass of the driven means 16. In the maximum stroke position, the wafer 20 has no counterbalancing effect because its central axis D, or the axis upon which its center of mass is disposed, coincides with the axis of rotation A.

The numbers "0," "4" and "8" as illustrated in FIGS. 3 through 6 indicate 0.025 inch increments of stroke. In other words, when the notch or indicator means in the wafer 20 is disposed adjacent the "8," as illustrated in FIG. 4, the stroke is .200 inch with each dot being an increment of 0.025 inch in the strike all the way to "0" where the stroke is zero.

FIG. 6 shows the assembly adjusted to the position where the stroke is zero. In the zero length of stroke position illustrated in FIG. 6, the third axis C, which is the axis of the connector means 18, coincides with the axis of rotation A so that there is no back and forth movement of the connector means 18 thereby providing a zero length stroke. When in the zero length of stroke position, however, the center of the mass of the wafer 20 which is disposed on the fourth axis D is displaced from the first axis A so that the mass of the wafer 20 counterbalances the additional or offset mass of the driving means 16, i.e. counterbalances the offset center of gravity of the driven means 16 which is disposed on the fifth axis E.

FIG. 5 shows the assembly in an intermediate length of stroke position (wherein the stroke would be .100 inch). In the position illustrated in FIG. 5, the third axis C of the connector means 16 as well as the fourth axis D of the wafer 20 are equally spaced from the axis of rotation A so that the combination of the wafer 20 and the connection means 18 counterbalances the driven means 16. Thus, in any adjusted position of stroke between zero and the maximum position the combination of the connection means 18 and the wafer 20 counterbalances the driven means 16.

FIG. 7 is a schematic representation for clarifying the relationship between the various axes. Assuming that the driven means 16 is not rotated so that its center of mass represented by the fixed axis E remains in the same position, it may be shown how the other axes change relationship relative to one another if the length of stroke is changed. The first axis A is the axis of rotation and does not change its position relative to the fifth axis E. Furthermore, the second axis B about which the third and fourth axes C and D rotate when adjusting the stroke of the assembly, remains fixed relative to the first axis A and the fifth axis E. In other words, the first axis A, the second axis B, and the fifth axis E are all disposed in a single plane and the second and fifth axes B and E rotate about the first axis A. When the assembly is in the maximum stroke position the fourth axis D, which represents the center of mass of the wafer 20, coincides with the first axis A and the third axis C, which represents the axis of the connection means 18, is offset from and disposed on the other side of the second axis B from the fourth axis D. In adjusting the stroke of the assembly by rotating the circular cylindrical member 40 in the hollow 30, the third and fourth axes C and D rotate about the second axis B to various selected positions and since these third and fourth axes C and D represent the center of masses of the connection means 18 and the wafer 20, the combination of the connection means 18 and the wafer 20 counterbalance the offset mass of the driven means 16 which is on the fifth axis E in any adjusted position or length of stroke. In the intermediate position, as illustrated in FIG. 5, the third axis C of the connection means 18 is in the position indicated at C′ in FIG. 7 and the fourth axis D which is the central axis of the wafer 20 is in the position illustrated at D′ in FIG. 7. In the zero length of stroke position, the third and fourth axes C and D would be reversed as shown in FIG. 7 with the third axis C coinciding with the axis of rotation A.

Thus, the center of mass of the connection means 18 is on the third axis C which is parallel to the first and second axes A and B. The center of mass of the intermediate means or wafer 20 is on the fourth axis D which is parallel to and offset from the second axis B and on the opposite side thereof from the third axis C. The second, third and fourth axes B, C and D are disposed in a single plane so that the third and fourth axes C and D rotate in unison about the second axis B and relative to the driven means 16 in adjusting the length of the stroke. The center of mass of the driven means 16 is on a fifth axis E which is parallel to and offset from the first axis A and on the opposite side thereof from the second axis B. The first, second and fifth axes A, B and E are in a single plane so that the combination of the connection means 18 and the intermediate means or wafer 20 counterbalances the driven means 16 for any length of stroke position between the zero length stroke position illustrated in FIG. 6 and the maximum length stroke position illustrated in FIG. 4.

The embodiments of the present invention in which an exclusive property or privilege is claimed are defined as follows:

1. A tool drive assembly comprising; reciprocating tool holder means, driven means rotatable about a first axis and having an additional portion of mass on one side of said axis so as to have a center of mass offset from said axis, connection means operatively connected to said tool holder means for reciprocating the latter, and intermediate means operatively interconnecting said driven means and said connection means to adjust the length of stroke of said reciprocating movement and for maintaining said driven means and said connection means counterbalanced relative to said axis, the mass of said connection means being substantially equal to said additional mass of said driven means on said one side of said axis, the counterbalancing mass of said intermediate means being substantially equal to the mass of said connection means, said intermediate means being movable relative to said driven means for movement between a zero length stroke position where said intermediate means counterbalances said driven means and a maximum length stroke position where said connection means counterbalances said driven means.

2. An assembly as set forth in claim 1 wherein said intermediate means is rotatable relative to said driven means for adjusting said length of said stroke, said intermediate means being rotatable relative to said driven means about a second axis which is parallel to and offset from said first axis.

3. An assembly as set forth in claim 2 wherein said connection means is rotatable relative to said intermediate means about a third axis which is offset from said second axis.

4. An assembly as set forth in claim 3 wherein: the center of mass of said connection means is on said third axis which is parallel to said first and second axes; the center of mass of said intermediate means is on a fourth axis which is parallel to and offset from said second axis and on the opposite side thereof from said third axis; said second, third and fourth axes being in a single plane so that said third and fourth axes rotate in unison about said second axis and relative to said driven means in adjusting said length of said stroke; the center of mass of said driven means is on a fifth axis which is parallel to and offset from said first axis and on the opposite side thereof from said second axis; said first, second and fifth axes being in a single plane so that the combination of said connection means and said intermediate means counterbalances said driven means for any length of stroke position between said zero length stroke position and said maximum length stroke position.

5. An assembly as set forth in claim 4 including a housing; and wherein said driven means includes a shank portion and an enlarged head portion, bearing means rotatably supporting said shank portion in said housing for rotation about said first axis, a circular hollow in said head portion with the center thereof on said second axis, said driven means further includes a cylindrical member rotatably disposed in said hollow, said intermediate means being connected to said cylindrical member, and said driven means includes adjustment means operable between said head portion and said cylindrical member for preventing rotation of said cylindrical member and operable to allow rotation of said cylindrical member for adjusting the length of said stroke.

6. An assembly as set forth in claim 5 wherein said intermediate means comprises a circular wafer integrally connected to said cylindrical member of said driven means, said wafer having a center on said fourth axis; said connection means includes a circular peg integral with and extending from said wafer with the center thereof on said third axis, second bearing means disposed about said peg, a collar disposed about said second bearings means, and cap means removably connected to said peg for retaining said second bearing means and said collar on said peg, a rod connected to said collar and extending therefrom in a direction transverse to said third axis for reciprocating said tool holder means.

7. An assembly as set forth in claim 6 wherein said tool holder means includes a tubular support member extending from said housing to a distal end thereof, a tool attaching member disposed at said distal end of said tubular support member, drive means slidably disposed within said tubular support member and operatively interconnecting said tool attaching member and said rod, and cover means connected to said tool attaching member for movement therewith and disposed about the exterior of said tubular support member for reciprocating sliding movement relative thereto.

8. An assembly as set forth in claim 7 including a component rotatably disposed about said tubular support member adjacent said housing, and lost motion means operatively interconnecting said component and said cover means for rotating said cover means and said tool attaching member about the axis of said tubular support member during reciprocating movement.

9. An assembly as set forth in claim 8 wherein said lost motion means comprises a shaft threadedly connected to one of said cover means and said component and slidably disposed in a bore in the other.

10. An assembly as set forth in claim 9 wherein said drive means includes a sleeve connected at a first end thereof to said tool attaching member and slidably disposed within said tubular support member, a ball rotatably retained in the second end of said sleeve and allowed to move longitudinally relative to said sleeve, spring means reacting between said ball and said tool holder member, said rod being connected to said ball.

11. An assembly as set forth in claim 1 wherein: the center of mass of said connection means and the center of mass of said intermediate means are rotatable relative to said driven means about a second axis which is parallel to and offset from said first axis, said center of mass of said connection means is disposed on a third axis which is parallel to and offset from said second axis; said center of mass of said intermediate means is disposed on a fourth axis which is parallel to and offset from said second axis and on the opposite side thereof from said third axis; said second, third and fourth axes are disposed in a single plane so that said third and fourth axes rotate in unison about said second axis; the center of mass of said driven means is disposed on a fifth axis which is parallel to and offset from said first axis and on the opposite side thereof from said second axis; and said first, second and fifth axes are in a single plane so that the combination of said connection means and said intermediate means counterbalance said driven means.

12. An assembly as set forth in claim 1 including a housing; and wherein said tool holder means includes a tubular support member extending from said housing to a distal end thereof, a tool attaching member disposed at said distal end of said tubular support member, drive means slidably disposed within said tubular support member and operatively interconnecting said tool attaching member and said connection means, and cover means connected to said tool attaching member for movement therewith and disposed about the exterior of said tubular support member for reciprocating sliding movement relative thereto.

13. An assembly as set forth in claim 12 including a component rotatably disposed about said tubular support member adjacent said housing, and lost motion means operatively interconnecting said component and said cover means for rotating said cover means and said tool attaching member about the axis of said tubular support member during reciprocating movement.

14. As assembly as set forth in claim 13 wherein said lost motion means comprises a shaft threadedly connected to one of said cover means and said component and slidably disposed in a bore in the other.

15. A tool drive assembly comprising; reciprocating tool holder means, a housing, and motion means in said housing for imparting reciprocating motion to said tool holder means, said reciprocating tool holder means including a tubular support member extending from said housing to a distal end thereof, a tool attaching member disposed at said distal end of said tubular support member, drive means slidably disposed within said tubular support member and operatively interconnecting said tool attaching member and said motion means, cover means connected to said tool attaching member for movement therewith and disposed about the exterior of said tubular support member for reciprocating sliding movement relative thereto, and means disposed on said support member and operatively connected to said cover through lost motion means for rotating said cover and said tool attaching member.

16. An assembly as set forth in claim 15 wherein said last mentioned means includes a component rotatably disposed on said tubular support member adjacent said housing, said lost motion means operatively interconnecting said component and said cover means for rotating said cover means and said tool attaching member about the axis of said tubular support member during reciprocating movement thereof.

17. An assembly as set forth in claim 16 wherein said lost motion means comprises a shaft threadedly connected to one of said cover and said component and slidably disposed in a bore in the other.

18. An assembly as set forth in claim 17 wherein said drive means includes a sleeve connected at a first end thereof to said tool holder member and slidably disposed within said tubular support member, a ball rotatably retained in the second end of said sleeve and allowed to move longitudinally relative to said sleeve, spring means reacting between said ball and said tool holder member, and a rod connected to said ball and extending from said sleeve and connected to said motion means.

19. A drive assembly comprising: driven means rotatable about a first axis, intermediate means rotatably supported by said driven means for selective rotation relative thereto about a second axis which is parallel to and offset from said first axis, connection means rotatably connected to said intermediate means for rotation relative thereto about a third axis while moved in a circular path by said intermeidate means, said third axis being parallel to and offset from said second axis, said intermediate means having a center of mass disposed on a fourth axis which is parallel to and offset from said second axis and on the opposite side thereof from said third axis, said driven means having a center of mass disposed on a fifth axis which is parallel to and offset from said first axis and on the opposite side thereof from said second axis, the relationship between said axes and said masses being such that the combination of said masses of said connection means and said intermediate means counterbalance the offset mass of said driven means.

References Cited

UNITED STATES PATENTS 2,690,081   9/1954   Björklund et al. _____ 74—44
3,007,230   11/1961  Riedl _____ 74—44

MILTON KAUFMAN, Primary Examiner

W. S. RATLIFF, Jr., Assistant Examiner

U.S. Cl. X.R.

74—600